US007529706B2

(12) United States Patent
Kulasooriya et al.

(10) Patent No.: US 7,529,706 B2
(45) Date of Patent: May 5, 2009

(54) SYSTEMS AND METHODS FOR PERFORMING INTERNATIONAL MONEY EXCHANGES

(75) Inventors: Mani Kulasooriya, Sunnyvale, CA (US); Ivan Liu, Redwood City, CA (US); Sylvia Liu, legal representative, Redwood City, CA (US); Lupti Cheung, Burlingame, CA (US); Hui Yin, Cupertino, CA (US); Paul Kelaita, San Mateo, CA (US); Yuet Peng Cheong, Redwood City, CA (US)

(73) Assignee: Yahoo! Inc., Sunnyvale, CA (US)

( * ) Notice: Subject to any disclaimer, the term of this patent is extended or adjusted under 35 U.S.C. 154(b) by 563 days.

(21) Appl. No.: 10/990,777

(22) Filed: Nov. 16, 2004

(65) Prior Publication Data

US 2006/0015437 A1 Jan. 19, 2006

Related U.S. Application Data

(60) Provisional application No. 60/588,182, filed on Jul. 14, 2004.

(51) Int. Cl.
*G06Q 40/00* (2006.01)
(52) U.S. Cl. .............................. 705/37; 705/39; 705/1; 705/42
(58) Field of Classification Search ................ 705/1, 705/39, 37; 235/381
See application file for complete search history.

(56) References Cited

U.S. PATENT DOCUMENTS

| 5,406,584 | A | | 4/1995 | Erisman |
| 5,757,917 | A | | 5/1998 | Rose et al. |
| 5,825,003 | A | * | 10/1998 | Jennings et al. ............ 235/379 |
| 5,826,241 | A | * | 10/1998 | Stein et al. .................... 705/1 |
| 5,903,878 | A | | 5/1999 | Talati et al. |
| 6,032,136 | A | | 2/2000 | Brake, Jr. et al. |
| 6,039,250 | A | | 3/2000 | Ito et al. |
| 6,044,360 | A | | 3/2000 | Picciallo |

(Continued)

FOREIGN PATENT DOCUMENTS

JP 2002-140645 A1 5/2002

(Continued)

OTHER PUBLICATIONS

Forex dealing: Automating the flow; Roger Preece ; Corporate Finance; Oct. 1994 ProQuest Central p. 28.*

(Continued)

*Primary Examiner*—Mary Cheung
*Assistant Examiner*—John H Holly
(74) *Attorney, Agent, or Firm*—Morrison & Foerster LLP

(57) ABSTRACT

Disclosed are systems and methods for effecting international online financial transactions between individuals or between individuals and entities such as banks, merchants and other companies. In one embodiment, requests for international currency exchanges are processed in batch form. A currency accumulator may be used to keep track of currency exchange requests, where each currency is assigned a notional "bucket," which is a symbolic representation of a database entry for the monetary amount which has been requested to be exchanged for a given currency. When the contents of a particular currency's "bucket" reaches a given level, the monetary amount in the bucket may be exchanged for an equivalent amount of a second currency.

29 Claims, 16 Drawing Sheets

U.S. PATENT DOCUMENTS

| | | | |
|---|---|---|---|
| 6,070,150 | A | 5/2000 | Remington et al. |
| 6,263,447 | B1 | 7/2001 | French et al. |
| 6,318,282 | B1 | 11/2001 | Tsai |
| 6,554,184 | B1 | 4/2003 | Amos |
| 6,898,575 | B2 | 5/2005 | Mull |
| 7,031,939 | B1 | 4/2006 | Gallagher et al. |
| 2001/0034676 | A1 | 10/2001 | Vasic |
| 2002/0016769 | A1 | 2/2002 | Barbara et al. |
| 2002/0022966 | A1 | 2/2002 | Horgan |
| 2002/0029190 | A1 | 3/2002 | Gutierrez-Sheris |
| 2003/0140004 | A1 | 7/2003 | O'Leary et al. |
| 2004/0111370 | A1 | 6/2004 | Saylors et al. |
| 2004/0236646 | A1* | 11/2004 | Wu et al. .................. 705/30 |
| 2006/0015452 | A1 | 1/2006 | Kulasooriya et al. |
| 2006/0015453 | A1 | 1/2006 | Kulasooriya et al. |

FOREIGN PATENT DOCUMENTS

| | | | |
|---|---|---|---|
| WO | WO-00/16227 | A1 | 3/2000 |
| WO | WO-00/28461 | A1 | 5/2000 |

OTHER PUBLICATIONS

"Advantages of the any Anypay EFT Solution," Anypay, located at <http://web.archive.org/web/20030201094157/www.anypay.com/site/ml/eng/htm/home/index.htm> visited on Oct. 24, 2007. (1 page).

"Electronic Funds Transfer," Fidelity Investments, located at <www.personal.fidelity.com/products/checking/content/eft.shtml> visited on Sep. 5, 2006. (2 pages).

"Ten Tips from AfiliateForce/2000," GMD Studios, located at <http://www.revenews.com/advice/strategy/forcetips.html> and <http://www.revenews.com/advice/strategy/more/forcetips2.html> visited on Oct. 24, 2007. (4 pages).

"Anypay for Auctions," Anypay, located at <http://web.archive.org/web/20030201091935/www.anypay.com/site/ml/eng/htm/home/home_auction_payments.htm> visited on Oct. 24, 2007. (1 page).

O'Brien, J. (May 2000). "Bank One Unveils E-mail Money Transfer Service," *Bank Systems & Technology* 37(5), 2 pages.

Paypal.com. (Jan. 31, 2000). "Paypal.com Becomes #1 Online Payment Service on eBay, Auction Community Picks Service that is Safe, Easy, Fast and Free" *PR Newswire*, 2 pages.

Sapsford, J. (Feb. 16, 2000). "You've Got Mail (with Cash!)—Paypal Sees Torrid Growth with a Service that Sends Money Across the Internet," *The Wall Street Journal*, 3 pages.

VeriSign, Inc. (Jul. 31, 2000) "VeriSign Selected by CIBC to Provide Internet Payment Connectivity for New Person-to-Person Payment Service," *PR Newswire*, 2 pages.

Waring, B.(Jul. 27, 2000). "Money is Just a Click Away: Web Services Make Person-to-Person Payments Painless, Paper-Free," SFGate.com, located at <http://www.sfgate.com/cgi-bin/article.cgi?%20file=/chronicle/archive/2000/07/27/BU98800.dtl> visited on Sep. 1, 2006. (3 pages).

Youngblood, D. (May 23, 1993). "Some Hung Up about Paying Bills Via a Computer," *Star Tribune*, 2 pages.

U.S. Appl. No. 10/990,773, filed Nov. 16, 2004 for Kulasooriya et al.

\* cited by examiner

Welcome,
PayDirect

Account Info - Help

Edit Wallet - Options - Sign Out

Send money - Fill out the information below and click "Continue".

Recipient's name: _____ 220

Recipient's email: _____ 230

Message title: (optional) _____ 240

Message: (optional) _____

Would you like to use identity confirmation? ○ yes ⊙ no  what's identity confirmation?  } 245

If yes, please specify a question: _____ 250

Amount to send: ____ 210

Pay using account: PayDirect

260 — [Continue] [Cancel]

FIG. 3

Welcome,
PayDirect

Account Info - Help
Edit Wallet - Options - Sign Out

— 400

Request money - Fill out the information below and click "Continue". For a more detailed bill with multiple line items, tax, shipping, click on "add detail" below.

Invoice#: (optional) — 450
Recipient's name: — 420
Recipient's email: — 430
Message title: (optional) — 440
Message: (optional)

Amount: $ 0.00 — 410

460 — Continue    Cancel    Add Detail

FIG. 5

EXAMPLE ①:
 ON MARKET
  1 "A" UNIT = 10 "B" UNITS
  TRANSACTIONAL FEE = X% OF EXCHANGE

1105 — $\left[ 1\text{ "A" UNIT} = \left(\frac{100-X}{100}\right) \times 10\text{ "B" UNITS} \right]$

F/X RETAINS X%

EXAMPLE ②:
 ON MARKET
  10 "B" UNITS = 1 "A" UNIT
  TRANSACTIONAL FEE = Y% OF EXCHANGE

1110 — $\left[ 10\text{ "B" UNITS} = \left(\frac{100-Y}{100}\right) \times \text{ "A" UNIT} \right]$

F/X RETAINS Y%

ACCUMULATOR ACCUMULATES "A" CURRENCY UNITS FROM ACCOUNTS $A_1$–$A_N$ AND EXCHANGES TO "B" CURRENCY UNITS UPON REACHING A PREDETERMINED AMOUNT.

SYSTEMS AND METHODS FOR PERFORMING INTERNATIONAL MONEY EXCHANGES

CROSS-REFERENCE TO RELATED APPLICATION

This application is related to and claims priority from U.S. provisional patent Application No. 60/588,182, filed on Jul. 14, 2004. This application is also related to U.S. patent application Ser. No. 09/639,014, filed on Aug. 15, 2000, entitled "Systems and Methods for Implementing Person-to-Person Money Exchange", U.S. application Ser. No. 10/990,774, filed Nov. 16, 2004, entitled "Systems and Methods for Implementing Account to Account Money Exchanges", U.S. application Ser. No. 10/990,775, filed Nov. 16, 2004, entitled "Systems and Methods for Implementing Person-to-Person International Exchanges", and U.S. application Ser. No. 11/112,316, filed Apr. 21, 2005, entitled, "Traffic Messaging System" which are all hereby incorporated herein by reference in their entirety.

FIELD OF THE INVENTION

The invention relates in general to effecting online financial transactions between individuals or between individuals and entities such as banks, merchants and other companies. More particularly, the invention relates to batch processing international money exchanges in an online context.

BACKGROUND

The present invention relates generally to online financial transactions, and more particularly to systems and methods for effecting person-to-person online financial transactions.

As more and more individuals become connected to the Internet, the number of e-commerce transaction grows proportionately. Currently, typical e-commerce transactions require individuals to submit confidential information such as credit card information or other bank account information over the Internet to effect a transfer of funds. For example, each time an individual purchases a product from a different merchant over the Internet, the individual must typically submit confidential credit card information to the merchant to complete the purchase transaction. The more an individual transmits such confidential information over the Internet the more opportunity there is for that information to be compromised.

Additionally, it is often difficult for individuals to effect monetary transactions without ultimately having a check sent from the payor to the payee; credit card transactions are not widely available for individuals. For example, in the context of an auction where one individual wins a bid to purchase an item from another individual, the purchaser must usually send a check to the seller. Such transactions are generally undesirable as postage is necessary to send the check, and processing of the check is required. This generally results in an undesirable increase in the amount of time and effort required to complete the transaction.

Accordingly, it is desirable to provide systems and methods for effecting online financial transaction between individuals or between individuals and merchants without the need for sending and cashing checks or transmitting confidential information.

SUMMARY

The present invention provides systems and methods for effecting online financial transactions between individuals or between individuals and entities such as banks, merchants and other companies. The present invention is particularly useful for performing international money exchanges. In one embodiment, a method includes receiving a plurality of monetary exchange requests to exchange a first currency for a second currency, and monitoring the amount of the first currency that has been requested to be exchanged pursuant to the plurality of monetary exchange requests. The method further includes processing the plurality of monetary exchange requests when the amount of first currency requested to be exchanged reaches a predetermined level.

Other aspects, features, and techniques of the invention will be apparent to one skilled in the relevant art in view of the following detailed description of the invention

BRIEF DESCRIPTION OF THE DRAWINGS

FIG. 3 illustrates an exemplary form for use during a send money transaction according to an embodiment of the present invention;

FIG. 5 illustrates an exemplary form for use during a request money transaction according to an embodiment of the present invention;

DETAILED DESCRIPTION OF EXEMPLARY EMBODIMENTS

Figure 1:
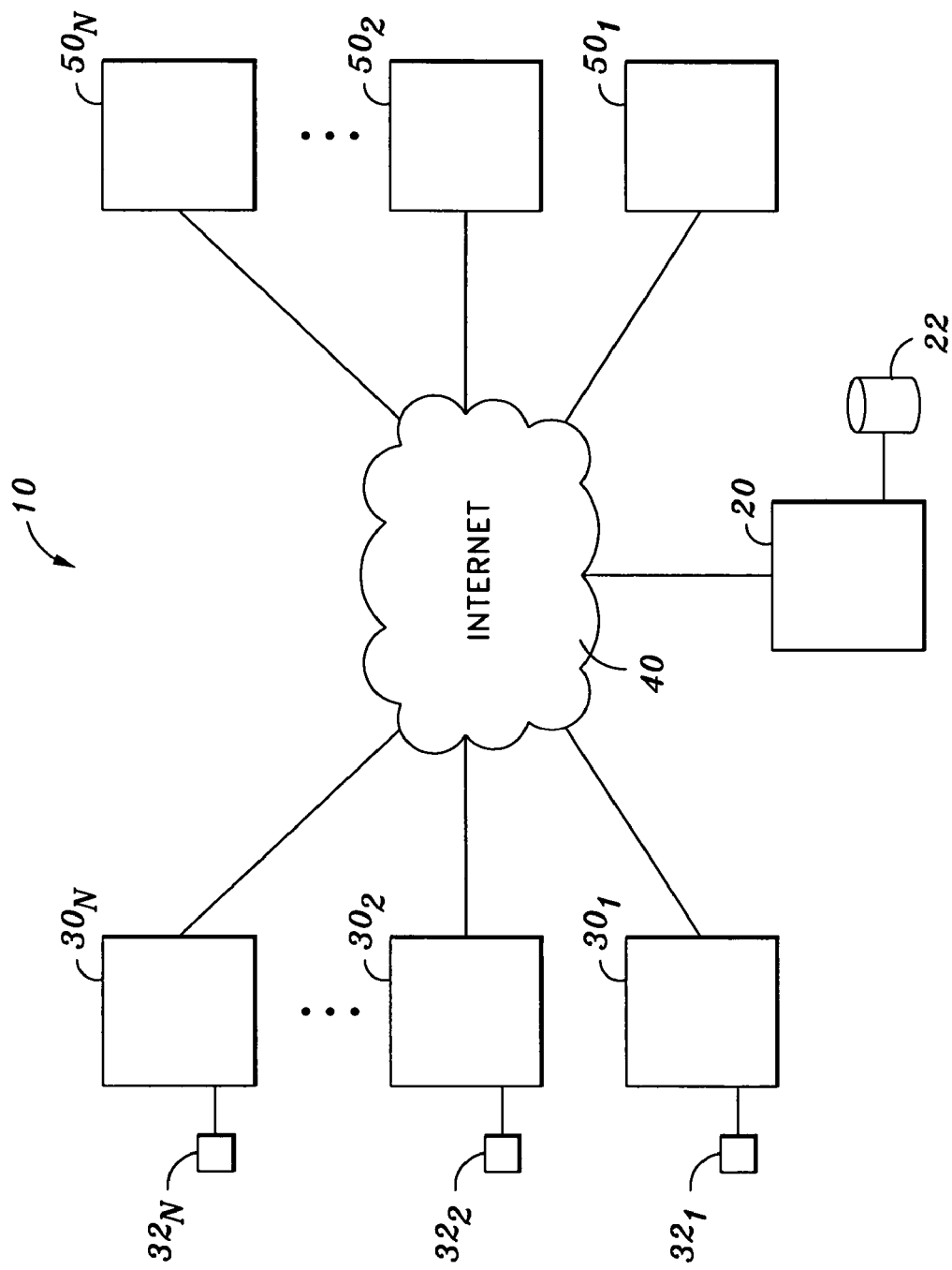
FIG. 1 illustrates a general overview of an information retrieval and communication network including a fund exchange server, client devices, and remote servers according to an embodiment of the present invention.

In one embodiment, a user may access a fund exchange server to establish an online account, which may then be used to transfer funds to and from other online accounts. An online account is generally a stored value account representing funds held in an account for the user at an affiliated financial institution. Each account, whether an individual account or a corporate account, may have one or more sub-accounts associated therewith. To fund an online account, funds may be transferred to an online account from, for example, a credit card account, direct demand account (DDA), or other financial account or from another online account. To withdraw funds, funds may be transferred to a credit card account or other bank account. In one embodiment, any user may initiate a send money transaction or a request payment transaction with any other entity provided that entity is able to receive an electronic message. For example, in one embodiment the receiving entity needs an ID or an e-mail address for an e-mail account to which an electronic message may be sent. It should be appreciated that the electronic message may be an e-mail message, instant message or other electronic message.

A user (e.g., an entity such as an individual or corporation) that desires to send money to another entity may do so by accessing an existing online account associated with the user and initiating a "send money" transaction. The user sending money (i.e., payor) enters an amount of funds to be transferred and contact information such as a user ID or an e-mail address of the recipient of the funds (i.e., payee). The payee may be an individual or other entity such as a corporation. The system sends an electronic message to the payee, for example, using an e-mail address if provided, indicating that the amount of funds has been "received" on the payee's behalf. In one embodiment, to effect transfer of the funds, the payee must access the system, for example, by selecting a URL or other link provided in the electronic message, and direct the received funds to an online account. An existing online account may be identified by the payee by providing information such as an account number and/or other identifying information, such as a password. If the payee does not have an existing online account, the payee may sign up for an account and provide credit card information or information for a checking account or other bank account sufficient to effect electronic transfer of funds. Thereafter, the received funds may be directed to the newly activated online account. At any point up to the time the received funds are deposited in the payee's online account, the payor can cancel the transaction according to one embodiment. In another embodiment, or in addition to one or more of the preceding embodiments, a user may withdraw any or all of the balance in their online account(s) at any time by transferring funds to a credit card account or other bank account.

A request money or request payment transaction (e.g., sending a bill) may also be initiated by a user (e.g., individual or corporation) that desires to receive payment from another entity. The user may enter an amount of funds owed and contact information such as an e-mail address for the recipient of the payment request (payor). In the case of multiple payors, an amount and contact information (e.g., user IDs and/or an e-mail address) may be necessary for each payor. The recipient of such a transaction request (payor) may be an individual or another entity such as a merchant corporation.

The system may then send a payment request to the payor via an electronic message, for example via e-mail to a provided address, and the payor may respond by selecting a URL or other link provided in the electronic message. If the payor accepts the payment request, the payor may identify an online account from which to transfer funds to the payee (initiator of the payment request). If the payor does not have an online account established, the payor may be required to sign up for an online account and provide credit card information, or information for a checking account, or other bank account sufficient to effect electronic transfer of funds, to fund the online account. Thereafter, the amount of funds may be transferred to the payee and the system sends an e-mail notification or other electronic message to the payee indicating that the funds have been "received" on the payee's behalf. To complete the transaction, the payee may be required to direct the received funds to an online account, for example, by providing an online account number and/or other identifying information such as a password. In one embodiment, the payor may cancel the transaction at any time until the payee directs the received funds to an online account.

Another aspect of the invention involves effecting online transactions in an international context. In one embodiment, users are able to access one or more fund exchange servers to establish online accounts, which may then be used to transfer funds to and from other users' online accounts.

Another aspect of the invention relates to effecting monetary exchanges of currency of different countries. In one embodiment, monetary exchanges are carried out using one or more fund exchange servers before transferring funds between online accounts from difference countries.

Another aspect of the invention is to perform batch-process international money exchanges, which in one embodiment leads to more favorable currency exchange rates. In the embodiment, a currency accumulator may used to keep track of currency exchange requests. In another embodiment, each currency processed by the accumulator may be assigned a "bucket," which is a symbolic representation of a database entry for the monetary amount which has been requested to be exchanged for a given currency. In another embodiment, or in addition to the previous embodiment, when the contents of a particular currency's "bucket" reaches a given level (e.g., predetermined minimum and/or maximum), the monetary amount in the bucket may be exchanged for an equivalent amount of a second currency (e.g., U.S. dollars).

In yet another embodiment of the accumulator, or in addition to the previous embodiments, the accumulator may further include a business rules engine which is usable to cause a bucket for a given currency to be emptied upon the occurrence of some event or condition. For example, a given currency's bucket may be emptied by the accumulator when the exchange rates for that currency (against the USD, for example) change. Moreover, the business rules engine may cause a currency's bucket to be emptied if trading in the particular currency is halted.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

FIG. 1 illustrates a general overview of an information retrieval and communication network 10 including a fund exchange server 20, client devices $30_1$ to $30_N$, and remote servers $50_1$ to $50_N$ according to an embodiment of the present invention. In computer network 10, clients 30₁ to 30_N are coupled through the Internet 40, or other communication network, to fund exchange server 20 and servers 50₁ to 50_N. While only one fund exchange server 20 is shown, it is understood that more than one fund exchange server can be used, either individually or in a distributed manner, and that other servers providing additional functionality may also be interconnected to any component shown in network 10 either directly, over a LAN or a WAN, or over the Internet.

Several elements in the system shown in FIG. 1 are conventional, well-known elements that need not be explained in detail here. For example, each client device 30 could be a desktop personal computer, workstation, cellular telephone, personal digital assistant (PDA), laptop, or any other device capable of interfacing directly or indirectly with the Internet. Each client 30 typically runs a browsing program, such as Microsoft's Internet Explorer, Netscape Navigator or the like, or a microbrowser such as a WAP enabled browser in the case of a cell phone, PDA or other handheld wireless devices, allowing a user of client 30 to browse pages and forms available to it from fund exchange server 20, servers 50₁ to 50_N or other servers over Internet 40. Each client device 30 also typically includes one or more user interface devices 32, such as a keyboard, a mouse, touchscreen, pen or the like, for interacting with a graphical user interface (GUI) provided by the browser on a monitor screen, LCD display, etc., in conjunction with pages and forms provided by find exchange server 20, servers 50₁ to 50_N or other servers. The present invention is suitable for use with the Internet, which refers to a specific global Internetwork of networks. However, it should be understood that other networks can be used instead of the Internet, such as an intranet, an extranet, a virtual private network (VPN), a non-TCP/IP based network, any LAN or WAN or the like.

According to one embodiment as will be described in more detail below, fund exchange server 20 and any related components are operator configurable using an application including computer code-run using a central processing unit such as an Intel Pentium processor or the like. Computer code for operating and configuring fund exchange server 20 as described herein is preferably stored on a hard disk, but the entire program code, or portions thereof, may also be stored in any other memory device such as a ROM or RAM, or provided on any media capable of storing program code, such as a compact disk medium, a floppy disk, or the like. Additionally, the entire program code, or portions thereof may be downloaded from a software source to fund exchange server 20 over the Internet as is well known, or transmitted over any other conventional network connection as is well known, e.g., extranet, VPN, LAN, etc., using any communication medium and protocol as are well known. Additionally, portions of the program code may be downloaded or provided to client device 30 and executed on client device 30.

In general, a user accesses and queries fund exchange server 20, servers 50₁ to 50_N, and other servers through a client device 30 to view and download content such as news stories, advertising content, search query results including links to various websites and so on. Such content can also include other media objects such as video and audio clips, URL links, graphic and text objects such as icons and hyperlinks, forms, pages and the like. Additionally, such content is typically presented to the user as a web page formatted according to downloaded JavaScript code and HTML code and data as is well known. In general, any Standard Generalized Markup Language (SGML) may also be used. Users are able to communicably access fund exchange server 20, e.g., over the Internet 40, using a client device 30 and conduct transactions, open online accounts and monitor online account activity as will be described herein.

A user may access fund exchange server 20 by selecting or entering the URL identifying the fund exchange server 20. One example of such a fund exchange server 20 is located at the URL https://paydirect.yahoo.com. When accessed, fund exchange server 20 preferably provides the user with one or more web pages including options for opening online accounts, accessing existing online accounts, initiating transactions, responding to transaction requests, etc. If the user has already established an online account, they may access an account page by providing an account number and security information such as a password and/or a security key. The account page may include various status information of pending and past transactions, account balance(s), user preferences, etc., as well as options for initiating various financial transactions. If the user does not have an established account, the user can select to open an account. The user can open an account by providing information such as an e-mail address, a password, mailing address and/or other information as may be necessary.

In general, an "online account" is an online stored value account representing an amount of funds held on the users behalf at an affiliate bank or other financial institution. A database 22 is provided for storing account information and data as is well known. To fund an account, the user must provide credit card information, e.g., credit card number, expiration date, etc., sufficient to effect a transfer of funds from a credit card account to the financial institution holding the user's actual funded account. An ATM check card (e.g., including a Visa logo) may also be used for transfer of funds to and from a checking account. ACH transfers may also be used to transfer funds to and from the affiliate financial institution as are well known. As shown in FIG. 1, each financial institution can be represented as one of servers 50 and a credit card company can be represented as another one of servers 50. A connection may also be established between fund exchange server 20 and credit card server 50 or with financial institution server 50 or with an ACH network server. When a transaction has been completed, transaction information is communicated from fund exchange server 20 to the financial institution server 50, and the user's actual account is credited or debited accordingly. When a user desires to fund an online account or withdraw funds from an online account, the financial institution server handles the actual fund transfers such as credit card debits and credits, ACH transfers and the like.

According to one embodiment, various online financial transactions may be initiated using an established online account, including a "send money" transaction, a "request money" transaction and a "move money" transaction. In a "send money" transaction, one is able to send funds to an entity such as another individual or a merchant, in a "request money" transaction, one is able to receive payment from another entity or entities, and in a "move money" transaction, one is able to transfer funds to and from a credit card account, ATM check card account, checking account, brokerage account, any other financial account, or another online account associated with the user.

Figure 2:
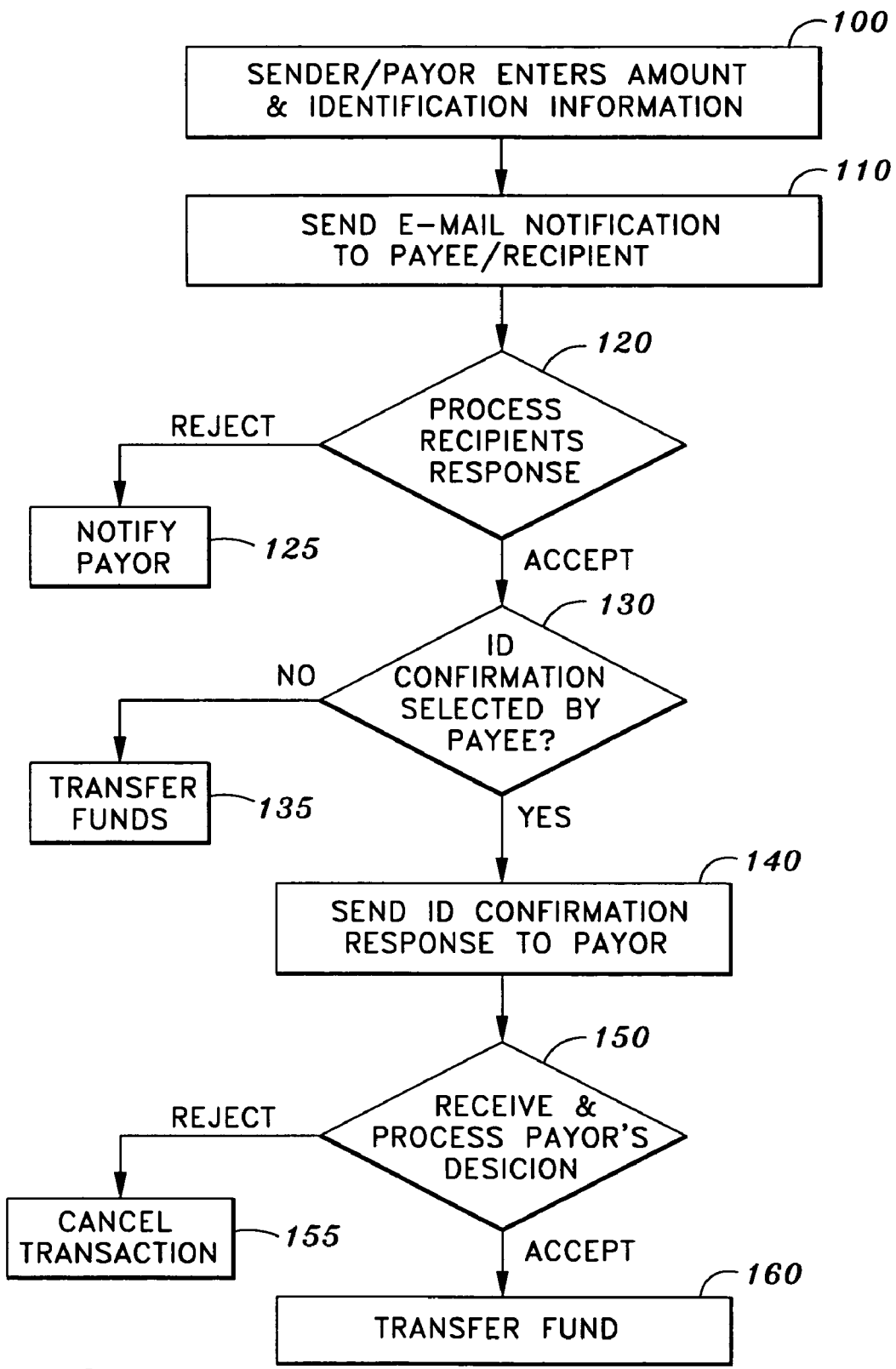
FIG. 2 illustrates the process of conducting a send money transaction according to an embodiment of the present invention.

FIG. 2 illustrates process of conducting a "send money" transaction according to an embodiment of the present invention. In this case, the initiator of the send money transaction is the "payor," and the recipient of the transaction request is the "payee". After the payor has selected the "send money" option, at block 100 the payor is prompted to enter an amount of funds for transfer and identification information for the recipient of the funds (payee). In one embodiment, identification information may include a name and an e-mail address of the payee or other contact information, such as a user ID for initiating an instant message (IM) session, and may also include an identity confirmation query. For example, in one embodiment as shown in FIG. 3, the payor is presented with a form 200 including an amount field 210, a name field 220, an address field 230, message fields 240, an identity confirmation selection button 245 and a query field 250. The payor then enters the appropriate information in the fields. In one embodiment, amount field 210 and e-mail address field 230 are required to be filled out, and the remaining fields are optional. If the payor selects to use the optionally provided identity confirmation feature, a query may also be inputted. The payee may then later be asked to confirm their identity by answering the query to the satisfaction of the payor, as will be discussed in more detail below.

After the amount and identification information has been entered and submitted, e.g., by selecting continue button 260, at block 110 the system processes the information and sends an electronic message (e.g., e-mail notification or IM) to the recipient (payee) using the contact information provided by the payor. The electronic message may include a link (e.g., URL link or other selectable link) to a web page located on the fund exchange server 20. In one embodiment, the electronic message only alerts the payee that funds are ready to be transferred to the payee. However, the electronic message can include various other information such as the sender's name, the amount of funds ready for transfer, etc.

Upon selecting the link, a communication session may be established between the payee (i.e., using client device 30) and the fund exchange server 20. The payee is provided with a web page or other online document that allows the payee to accept or reject the "send money" transaction. For example, in one embodiment, a form is provided with various fields and selection buttons. If the identity confirmation feature was selected by the payor, the payee may also be presented with the identity confirmation query and a field for entering a response to the query. The payee must identify an account into which the funds are to be transferred, e.g., by providing an account number and password. If the payee does not have an account established, an account can be opened as described above. After all appropriate information has been entered and submitted by the payee, the system processes the received information at block 120. If the payee rejected the transaction, at block 125 the payor is notified of the rejection, e.g., by an e-mail notification message or by updating the payor's account page, and the transaction is canceled. If the payee has accepted the transaction, the system determines whether identity confirmation is active for the current transaction at block step 130. If the identity confirmation feature was not selected by the payor, at block 135 the funds may be transferred from the payor's account to the account identified by the payee. If, however, the identity confirmation feature was selected, the payor may be notified at block 140 that the payee has responded to the identity confirmation query, which in one embodiment is done using an electronic message. The response may also be included in an electronic message along with a URL link to the system. However, the response may alternatively be posted to the payor's account page for review the next time the payor logs into the system.

If the payor is satisfied with the information provided in the identity confirmation response, the payor may respond to the system with a decision. For example, the payor may select an accept button or a reject button. At block 150, the system receives and processes the payor's decision. If the payor rejected the identity confirmation response, the transaction may be canceled at block 155. If the payor accepted the response, at block 160 the funds may be transferred from the payor's account to the account identified by the payee. The payor may also be able to cancel the transaction at any time until the funds are transferred to the payee's account.

Figure 4:
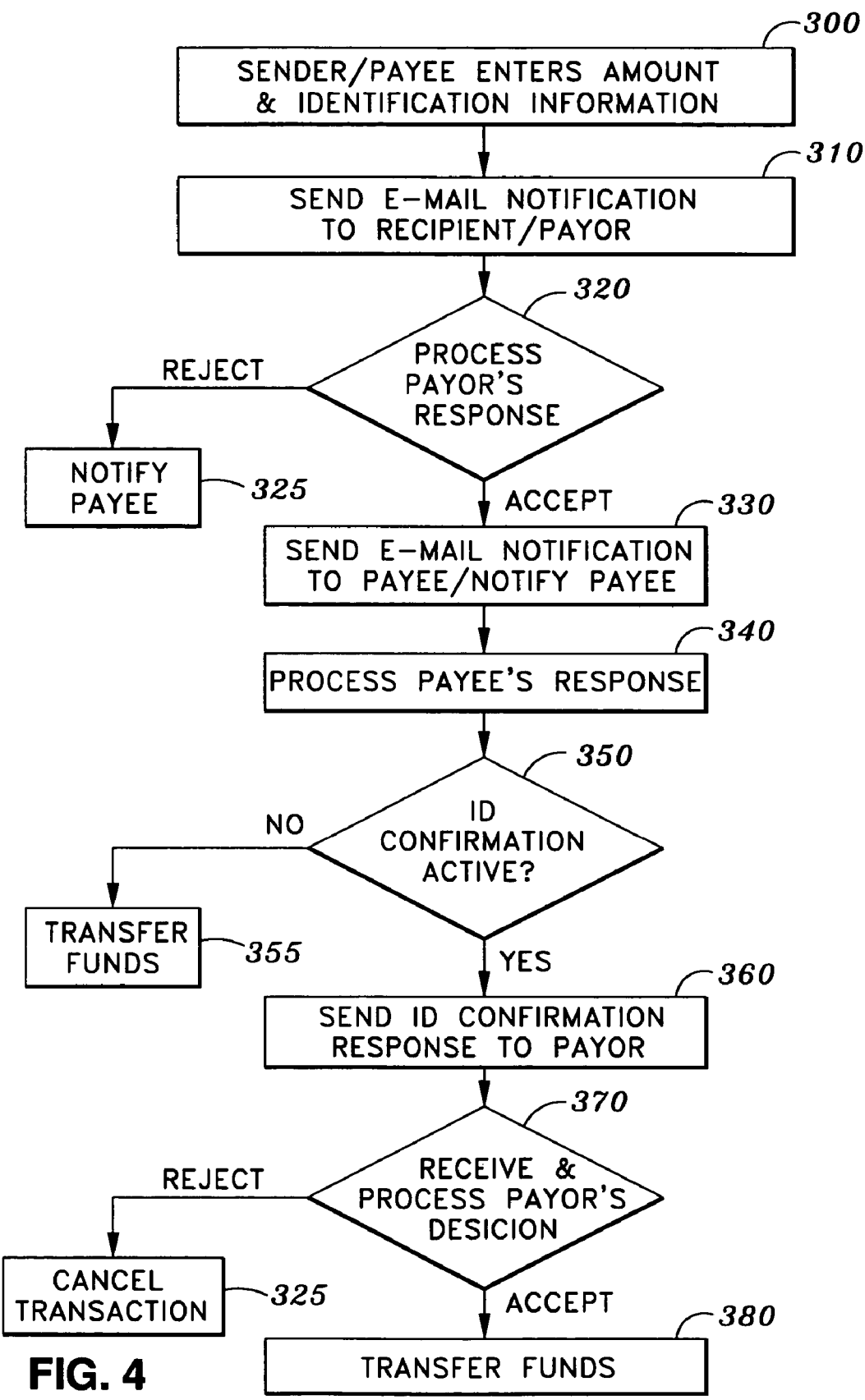
FIG. 4 illustrates the process of conducting a request money transaction according to an embodiment of the present invention.

FIG. 4 illustrates the process of conducting a "request money" transaction according to an embodiment of the present invention. In this case, the initiator of the request money transaction is the "payee," and the recipient of the transaction request is the "payor". After the payee has selected the "request money" option from the account page, at block 300 the payee is prompted to enter an amount of funds for transfer and identification information for the recipient of the payment request (payor). Identification information may include a name and an e-mail address of the payor or other contact information such as a user ID for initiating an instant message (IM) session. For example, in one embodiment as shown in FIG. 5, the payee is presented with a form 400 including an amount field 410, a name field 420, an address field 430, message fields 440, and an invoice field 450. The payee enters the appropriate information in the fields. In one embodiment, amount field 410 and e-mail address field 430 are required to be filled out, and the remaining fields are optional.

After the amount and identification information has been entered and submitted, e.g., by selecting continue button 460, at block 310, the system may then process the information and send an electronic message (e.g., e-mail notification or IM) to the recipient (payor) using the contact information provided by the payee. The electronic message typically includes a link (e.g., URL link or other selectable link) to a web page located on the fund exchange server 20. In one embodiment, the electronic message only alerts the recipient that a payment request (e.g., invoice or bill) has been received. It should be appreciated that the electronic message may also include various other information, such as the sender's name, the amount of funds desired to be transferred, etc.

Upon selecting the link, a communication session is established between the payor (i.e., using client device 30) and the fund exchange server 20. The payor may then be provided with a web page or other document that allows the payor to accept or reject the "request money" transaction. For example, in one embodiment, a form is provided with various fields and selection buttons. The payor may be required to identify an account from which the funds are to be transferred, e.g., by providing an account number and password. If the payor does not have an account established, an account can be opened and funded as described above. If the payor accepts the transaction, they may then be provided with the ability to select the identity confirmation feature. If the identity confirmation feature is selected, the payor may be required to enter a query. After all appropriate information has been entered and submitted by the payor, the system processes the received information at step 320. If the payor rejected the transaction, at block 325 the payee is notified of the rejection, e.g., by an electronic message or by updating the payee's account page. If the payor has accepted the transaction, at block 330 the system may notify the payee, e.g., by sending an electronic to the payee indicating that the transaction has been accepted by the payor. In one embodiment, the payor may select to accept the transaction in part, in which case the payor must enter the partial payment amount. The partial payment amount may also be communicated to the payee, either in an electronic message indicating acceptance or by posting to the payee's account page. If the payor has selected the optional identity confirmation feature, the query is also communicated to the payee, either in an electronic message indicating acceptance or by posting to the payee's account page. The electronic message may also include a link to a web page located on the find exchange server 20.

Upon selecting the link, a communication session is established between the payee (e.g., using client device 30) and the fund exchange server 20. In one embodiment, the payee is provided with a web page that allows the payee to direct the "received" funds to an online account. For example, the payee may be provided with an account page for an account associated with the payee. Alternately, or in addition, a form is provided with various fields and selection buttons. If the identity confirmation feature was selected by the payor, the payee is also presented with the identity confirmation query and a field for entering a response to the query. The payee may be required to identify an account into which the funds are to be transferred, e.g., by designating the account associated with the active account page, or by providing an account number and password for another account associated with the payee. If desired, the payee may open another account as described above.

After all appropriate information has been entered and submitted by the payee, the system processes the received information at block 340. The payee may also be provided with an option to cancel the transaction at this point. At block 350, the system determines whether identity confirmation is active for the current transaction. If the identity confirmation feature was not selected by the payor, at block 355 the funds may be transferred from the payor's account to the account identified by the payee. If the identity confirmation feature was selected, the payor may be notified (which in one embodiment is done via an electronic message) that the payee has responded to the identity confirmation query. This response may be included in an electronic message along with a URL, link to the system. However, the response may also be posted to the payor's account page for review the next time the payor logs in to the system.

If the payor is satisfied with the information provided in the identity confirmation response, the payor may respond to the system with a decision. For example, the payor may select an accept button or a reject button. At block 370, the system receives and processes the payor's decision. If the payor rejected the identity confirmation response, the transaction may then be canceled at block 375. If the payor accepted the response, at block 380 the funds are transferred from the payor's account to the account identified by the payee. The payor may also be able to cancel the transaction at any time until the funds are transferred to the payee's account.

Figure 6:
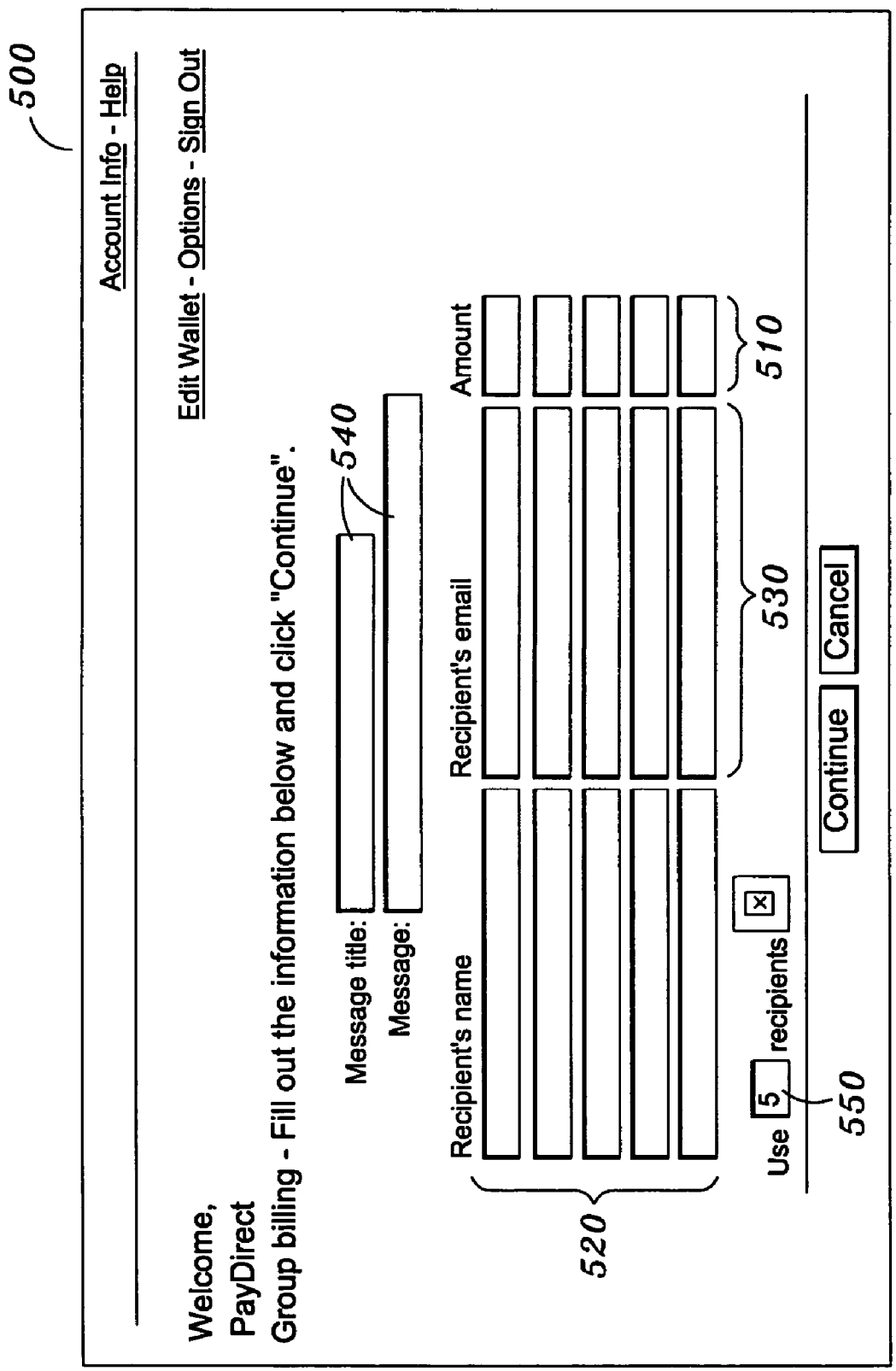
FIG. 6 illustrates an exemplary form for use during a request money transaction involving multiple recipients according to an embodiment of the present invention.

In one embodiment, a multiple payor bill may be submitted as part of a "request money" transaction. FIG. 6 illustrates an exemplary form 500 for use during a request money transaction involving multiple recipients (payors) according to one embodiment. Form 500 may include amount fields 510, name fields 520, address fields 530, message fields 540, and a selection field 550 for selecting the number of recipients. In one embodiment, the payee enters the appropriate information in the fields, submits the form, and the system thereafter submits transaction requests to each individual payor and conducts transaction processing individually as described above with reference to FIG. 4.

In a "move money" transaction, funds may be transferred to and from an online account. According to one embodiment, funds may be withdrawn from an online account to a credit card account, an ATM check card account, checking account or other financial account. According to another embodiment, funds may be transferred to an online account from a credit card account, an ATM check card account, checking account or other financial account. The financial institution server 50 effects the transfer of the actual funds with the appropriate account server, e.g., credit card server, ACH network server, bank server, etc. In another embodiment, funds may be transferred between online accounts associated with the user. For example, the user may have two or more separate online accounts or one or more online sub-accounts may be tied to a master online account. For sub-accounts, actual funds are debited or credited to an account at the financial institution associated only with the master account, such that when an online transaction involving a sub-account is completed actual funds may only be withdrawn from, or added to, the master account. Funds may be moved between the master account and a sub-account by the entity controlling the master account. Sub-accounts are useful for many applications, including, for example, allowing parents (controlling master account) to provide a monthly allowance to a child (sub-account) away at college or providing a limited spending account (sub-account) for an employee in charge of buying office supplies for a company (controlling master account).

Figure 7:
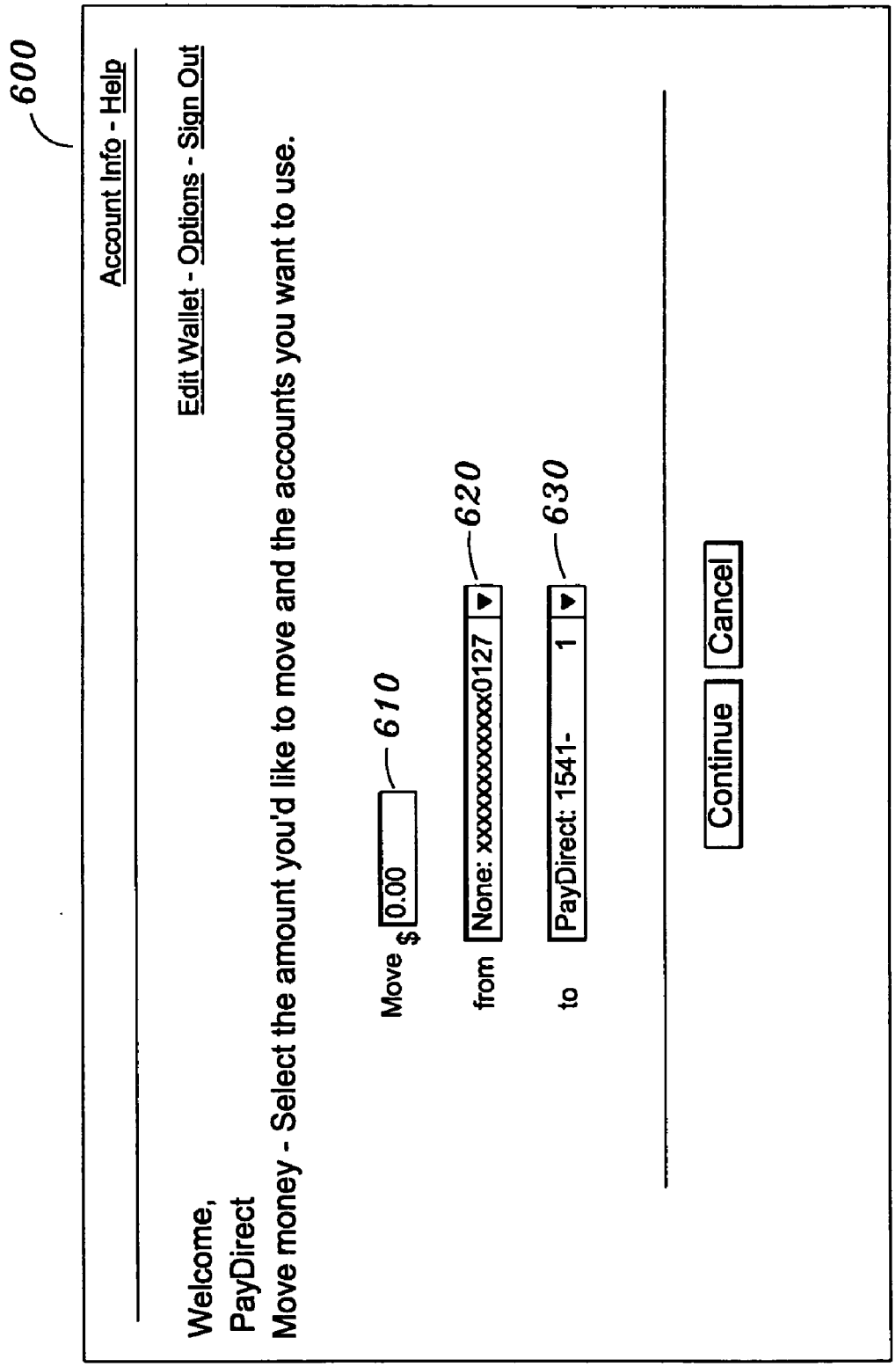
FIG. 7 illustrates an exemplary form for use with a "move money" transaction according to an embodiment of the invention.

To effect transfer between online accounts and between an online account and a credit card account, ATM check card account, checking account or other financial account, the user is preferably provided with a form with fields for entering the amount desired to be transferred, the account into which funds are to be transferred and the account from which funds are to be transferred. FIG. 7 illustrates an exemplary form for use with a "move money" transaction according to one embodiment. As shown in the embodiment of FIG. 7, form 600 includes an amount field 610, an account field 620 from which funds are to be transferred and a second account field 630 into which funds are to be transferred. It should be appreciated that other fields may be presented for other necessary information such as passwords, PIN numbers, expiration dates, routing numbers, etc. If a user has previously entered account information, the user may be able to select that account without having to re-enter the information. When filled out, the user may submit the form so that the system can process the information and move the funds accordingly. For online-account-to-online-account moves, database 22 may be updated, and for transfers to and from online accounts, financial institution server 50 is provided with the appropriate information so as to effect the actual transfer of funds to or from the credit card account, conduct ACH settlement, etc.

According to one embodiment, multiple affiliate banks are provided for conducting settlements, e.g., ACH settlements with other banks, check card transactions, transactions with credit card companies, etc. Referring to FIG. 1, for example, one affiliate financial institution may be represented as server $50_1$, and a second financial institution as server $50_2$. In this embodiment, a user may be given an option to choose an affiliate bank to conduct the settlements. For example, the different affiliate financial institutions may offer different fee schedules, award programs, etc. After a user selects an affiliate financial institution, that institution may then become the default until changed by the user. In one embodiment, both parties to a transaction (i.e., payor and payee) may identify the same or different affiliate financial institutions for conducting settlement for the transaction. Additionally, different default affiliate banks may be selected by a user depending on the type of settlement. Database 22 may be used to store the affiliate bank preferences and other user preferences in relation to each online account.

According to yet another embodiment, a transaction limit is placed on an online account until it has been established that the user is able to receive mail at a billing address, e.g., for a credit card or ATM check card. In this embodiment, the user is limited to sending or receiving no more than a certain amount (e.g., $200) until the user has verified that they are able to receive U.S. mail at the billing address. When the user signs up or registers with the system, a letter may be sent to the billing address. In one embodiment, the letter includes a code, such as an alphanumeric code. After the letter and code have been received, the user can verify/confirm the physical billing address by entering the code when logging in to the system. Once the physical address has been confirmed, the transaction limit may be raised. In one embodiment, the transaction limit is automatically raised, for example, to the lesser of $1000/month or the credit card limit, if credit card information was entered. Alternatively, the transaction limit may be set by the user, within a specified maximum set by the system. It will also be appreciated that any transaction limit determining scheme may be used.

Figure 8:
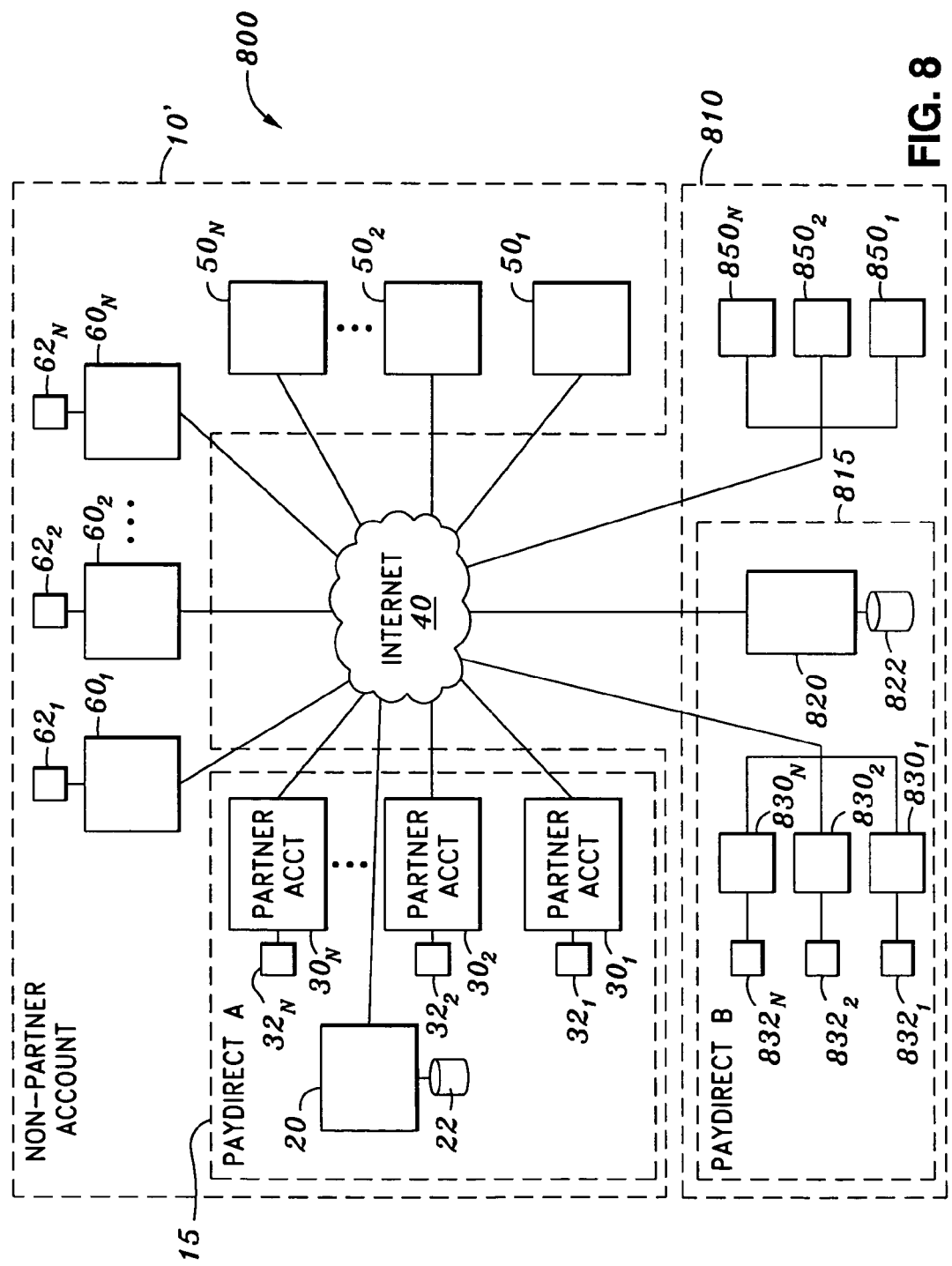
FIG. 8 illustrates another embodiment of a system level diagram for the international information retrieval and communication network of FIG. 1.

FIG. 8 depicts an international communication network 800, which includes a first communication network 10' and a second communication network 810, where the first communication network 10' and the second communication network 810 may be in different countries. As with the information retrieval and communication network 10 of FIG. 1, the communication network 10' includes an monetary exchange instance 15 comprised of a fund exchange server 20, database 22, partner accounts $30_1$-$30_n$ with user interface devices $32_1$-$32_n$. In addition, the communication network 10' includes financial institution servers $50_1$-$50_n$ and non-partner accounts $60_1$-$60_n$, which in one embodiment are remotely located and accessible using interface devices $62_1$-$62_n$.

Continuing to refer to FIG. 8, as with the first communication network 10', the second communication network 810 also includes a second monetary exchange instance 815 comprised of a fund exchange server 820, database 822, partner accounts $830_1$-$830_n$ with user interface devices $832_1$-$832_n$. In addition, the communication network 810 includes financial institution servers $850_1$-$850_n$. Moreover, the second communication network 810 may be connected to non-partner accounts $60_1$-$60_n$ via Internet 40. In this fashion, the information retrieval and exchange described above with reference to FIG. 1 and network 10 similarly may be applied in an international context.

Figure 9:
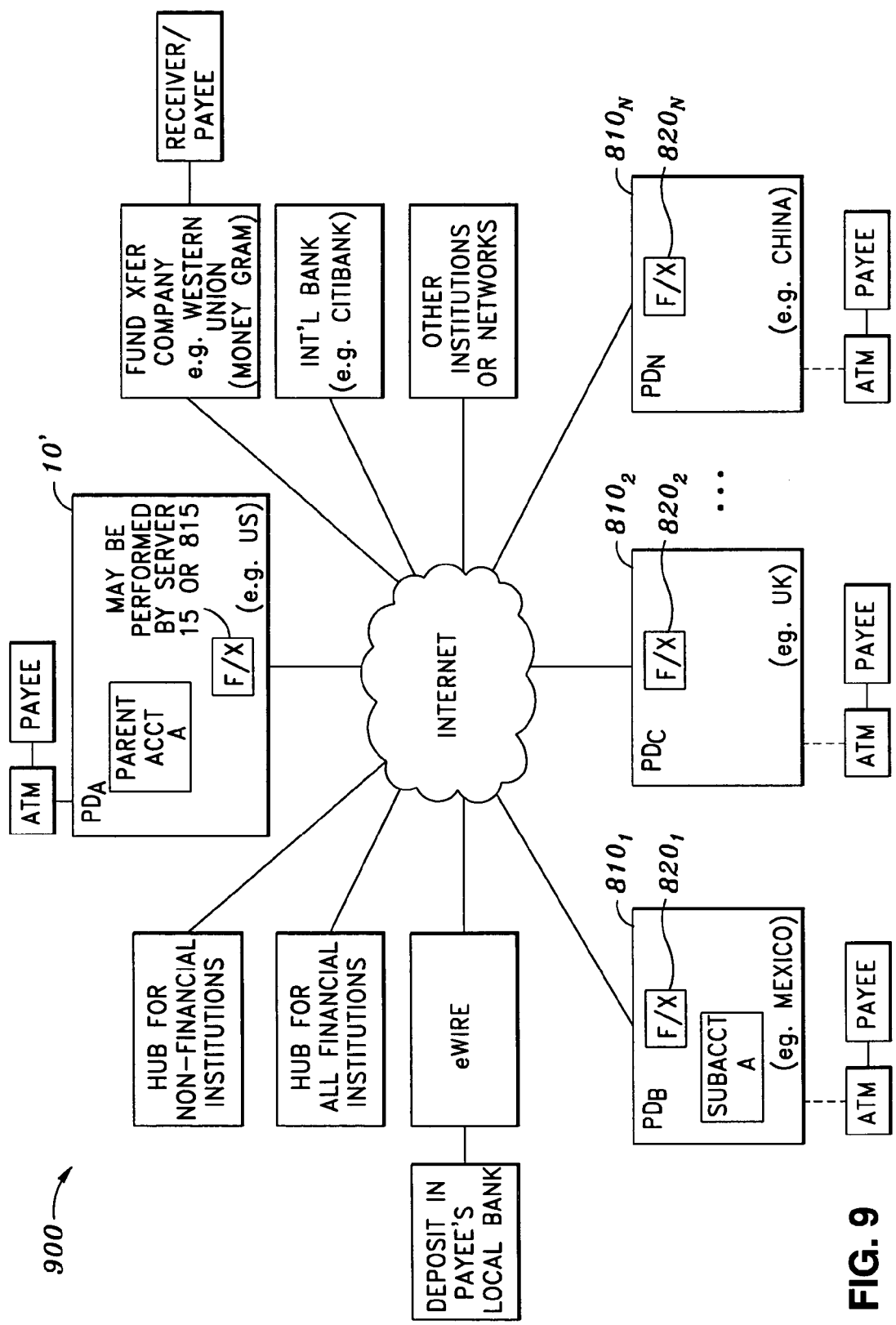
FIG. 9 illustrates another embodiment of an international network capable of carrying out one or more aspects of the invention.

Referring now to FIG. 9, depicted is another embodiment of an international communication network 900 in which the first communication network 10' is coupled to a plurality of communication networks $810_1$-$810_n$ via the Internet 40. In the embodiment of FIG. 9, each of the plurality of communication networks $810_1$-$810_n$ correlate to a particular country (e.g., Mexico, United Kingdom, China, etc.). Each of the plurality of communication networks $810_1$-$810_n$ include fund exchange servers $820_1$-$820_n$. Moreover, each of the pluralities of communication networks $810_1$-$810_n$ is accessible to a payee via an automated teller machine (ATM). As shown in FIG. 9, and as will be described in more detail below, any number of financial institutions and other sources of funds (e.g., banks, Western Union, eWIRE) can be used to provide funds to payees located in countries other than the originating country via local ATM machines.

Figure 10:
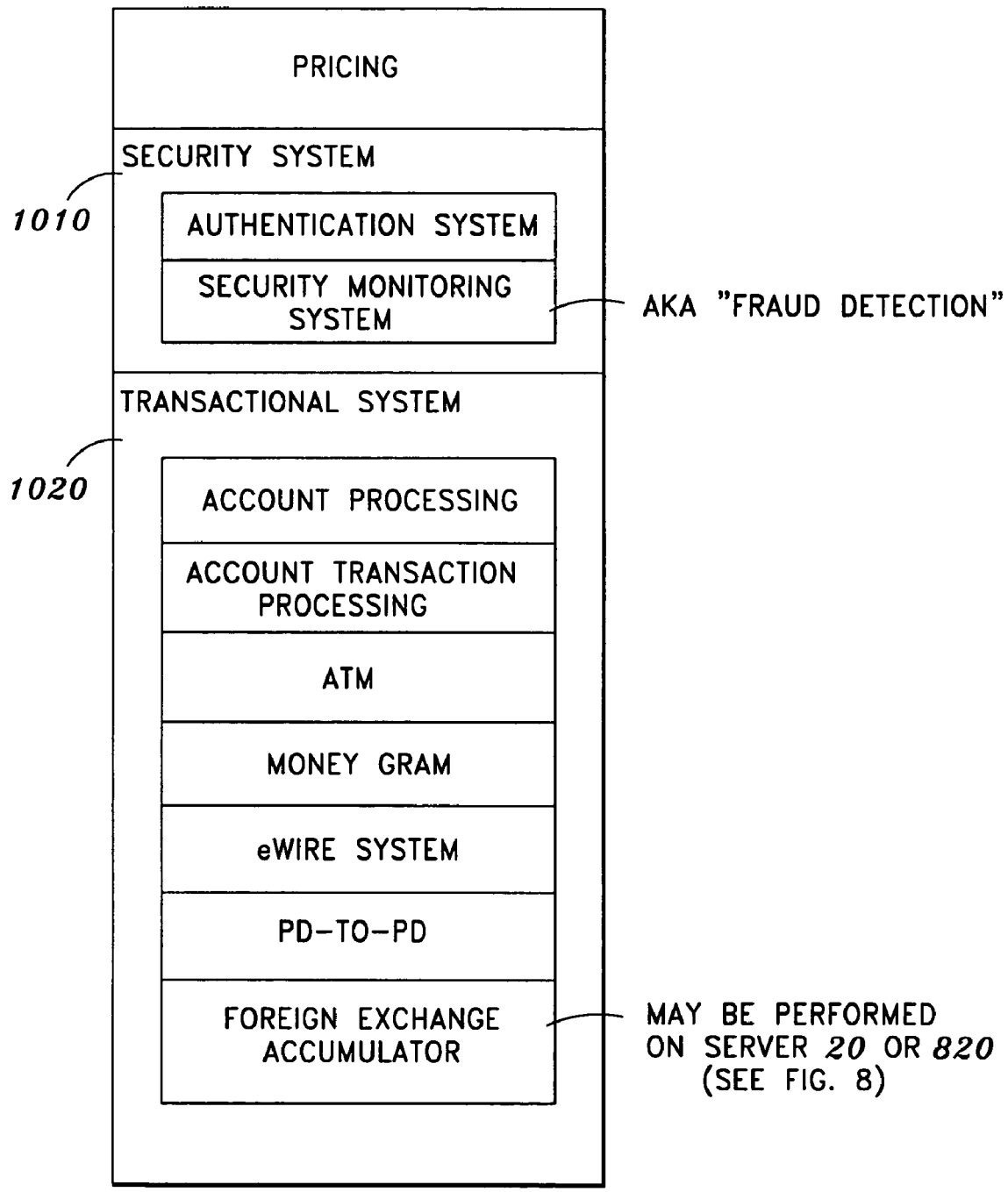
FIG. 10 illustrates various software modules for carrying out one or more aspects of the invention, according to one embodiment.

Two aspects of the invention include a security system and a transactional system. To this end, FIG. 10 illustrates the various systems and/or components that comprise the security system 1010, the transactional system 1020 and the pricing engine 1030. In particular, the security system 1010 includes an authentication system and a security monitoring system, both of which are described below in more detail with reference to FIGS. 16-20. It should be appreciated that the authentication system and security monitoring system may be implemented as one or more software modules executing on fund exchange server 20 and/or fund exchange servers $820_1$-$820_n$. It should be understood that more than one fund exchange server may be used, either individually or in a distributed manner, and that other servers providing additional or supplemental functionality may also be used.

The transactional system 1020, in the embodiment of FIG. 10, comprises the following systems/modules: account processing, account transaction processing, ATM, Money Gram, eWIRE, PD-to-PD, and foreign exchange accumulator. In one embodiment, these systems are implemented as software modules, some of which may be implemented on fund exchange server 20 and/or fund exchange servers $820_1$-$820_n$. As shown in FIG. 9, it should further be appreciated that one or more of aforementioned systems/modules may be implemented on other servers, either individually or in a distributed manner, that are connected to the Internet 40.

The pricing engine 1030 may be used to determine the fee that will be imposed for a given transaction. In one embodiment, the fee may be based on one or more factors, such as the origination and/or destination country involved in the transaction, the individual requesting the transaction, the amount of the transaction, programs related to the transaction and/or promotional/incentive-based factors. For example, repeat or referred customers may receive reduced transaction fees, or given one or more free transactions as part of a promotion.

Figure 11:
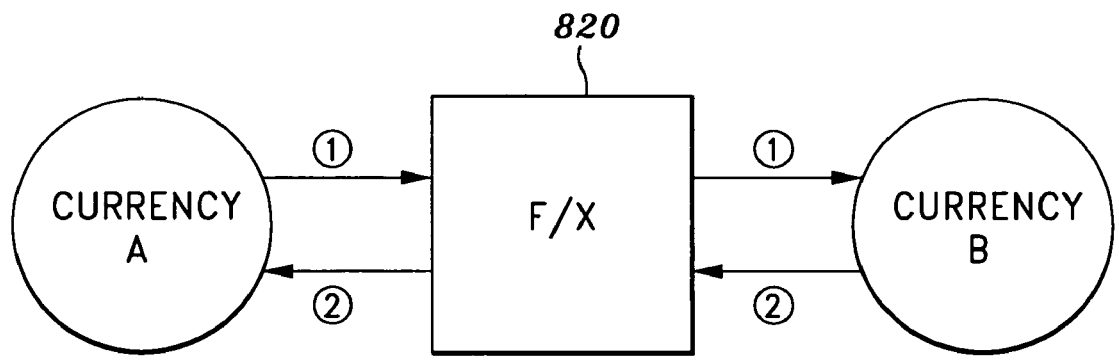
FIG. 11 illustrates two exemplary approaches of performing currency exchange.

Referring now to FIG. 11, depicted is an exemplary fund exchange server 820 which is being used to exchange currency from a first country (Currency A) with currency from a second country (Currency B), in accordance with the principles of the invention. In Example 1, one unit of Currency A is equal to ten units of Currency B. A transactional fee of X % is imposed. In such a case, the exchange formula would be formula 1105, as shown in FIG. 11. Similarly, where 10 units of Currency B is equal to one unit of Currency A, with the transactional fee being Y %, the applicable exchange formula would be formula 1110. In one embodiment, fund exchange server 20 and/or fund exchange servers $820_1$-$820_n$ may use formulas 1105 and 1110 to carry out one or more monetary exchanges over the Internet 40 between a plurality of monetary exchange instances (e.g., monetary exchange instance 15, monetary exchange instance 815, etc.).

Figure 12:
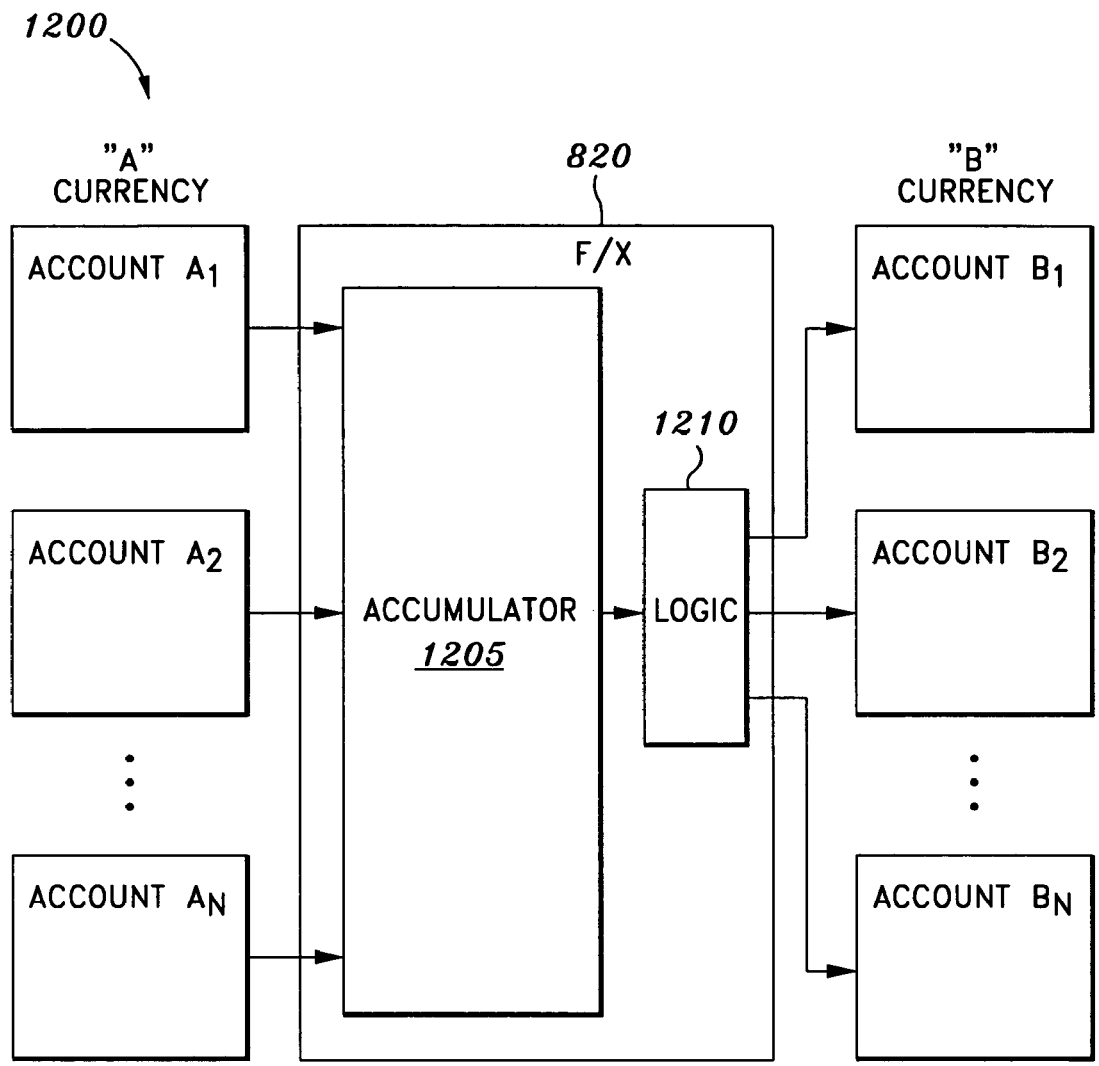
FIG. 12 is one embodiment of a system for batch processing currency exchanges, consistent with the principles of the invention.

FIG. 12 depicts a system level diagram of how currency exchanges may be batch processed according to the principles of the invention. It may be desirable to process currency exchanges in bath form in order to obtain more favorable currency exchange rates. In the embodiment of FIG. 12, system 1200 includes a fund exchange server 820 coupled to accounts $A_1$-$A_N$ which recognize Currency A and account $B_1$-$B_N$ which recognize Currency B. Fund exchange server 820 includes accumulator 1205 and logic 1210 in one embodiment, although alternate configurations are equally possible. In one embodiment, accumulator 1205, working with logic 1210, may provide one or more of the following: information about the current conversion rates between Currency A and Currency B, storing of cross-currency deals as they are booked, performing appropriate cross-currency sales and purchases, end of day reconciliation and profit information, etc.

In one embodiment, the accumulator 1205 may interact with one or more monetary exchange instances (e.g., instances 15, 815, etc.), a system for performing foreign currency exchanges (e.g., HSBC's eTreasury system), and a customer service interface for managing the accumulator 1205. In addition, the accumulator 1205 may include one or more of the following components:

A business rules engine (described in more detail below);
A database containing current values of the parameters for each business rule;

A database containing each transaction that has been processed by the accumulator 1205;

A database containing all trades processed by the accumulator 1205 over some period of time; and Interfaces to each external system.

It should of course be understood that one or more of the aforementioned components may be merged together (e.g., one database for all data stored).

The business rules engine may be used to govern the behavior of the accumulator 1205. In one embodiment, each currency is assigned a "bucket," which is a symbolic representation of a database entry for the monetary amount which has been requested to be exchanged for a given currency. In another embodiment, or in addition to the previous embodiment, when the contents of a particular currency's "bucket" reaches a given level (e.g., predetermined minimum and/or maximum), the monetary amount in the bucket may be exchanged for an equivalent amount of a second currency (e.g., U.S. dollars). In one embodiment, this is done using the eTreasury system.

The eTreasury system may also specify minimum and maximum trading amounts. If the predetermined minimum and/or maximum for a currency's bucket is outside the range specified by the eTreasury system, the predetermined limits may be reduced to match the eTreasury values.

In yet another embodiment, or in addition to the previous embodiments, the business rules engine may cause a bucket for a given currency to be emptied when the exchange rates for that currency (against the USD, for example) change. Moreover, the business rules engine may cause a currency's bucket to be emptied if trading in the particular currency is halted.

In another embodiment, or in addition to the previous embodiments, a notional "end of day" time may be established at which point all currency buckets will be processed. Moreover, currency buckets may be cleared via a manual command. At the "end of day" time, there will likely be an overall profit amount. This profit amount represents the difference between the amount of currency received from each monetary exchange instance and the amount of currency that was traded via the eTreasury system. In one embodiment, this profit may be split amongst each of the monetary exchange instances involved and a message sent to each instance reporting that instance's share of the profit.

Another aspect of the business rules engine relates to a notional start of each trading day. At this point in time, currency exchange rates may be received from the eTreasury system, to which a loading may be added to produce profit margins for the exchange system. Loadings can be applied to the buy and sell rates for each currency pair asymmetrically (that is, the same loading need not be applied to both the buy and sell rates). The loadings can be applied to any currency pair which can be traded via the accumulator system, not just to the rates of a given currency against the US dollar. Some of the possible types of loading include a percentage offset from the current value or a fixed number of points away from the given rate.

Continuing to refer to FIG. 12, accumulator 1205 and logic 1210 are shown accumulating Currency A units from accounts $A_1$-$A_N$, and exchanging such units to Currency B units which are deposited into account $B_1$-$B_N$. As will be described in more detail below, this exchange is triggered upon reaching a predetermined amount of units.

Figure 13:
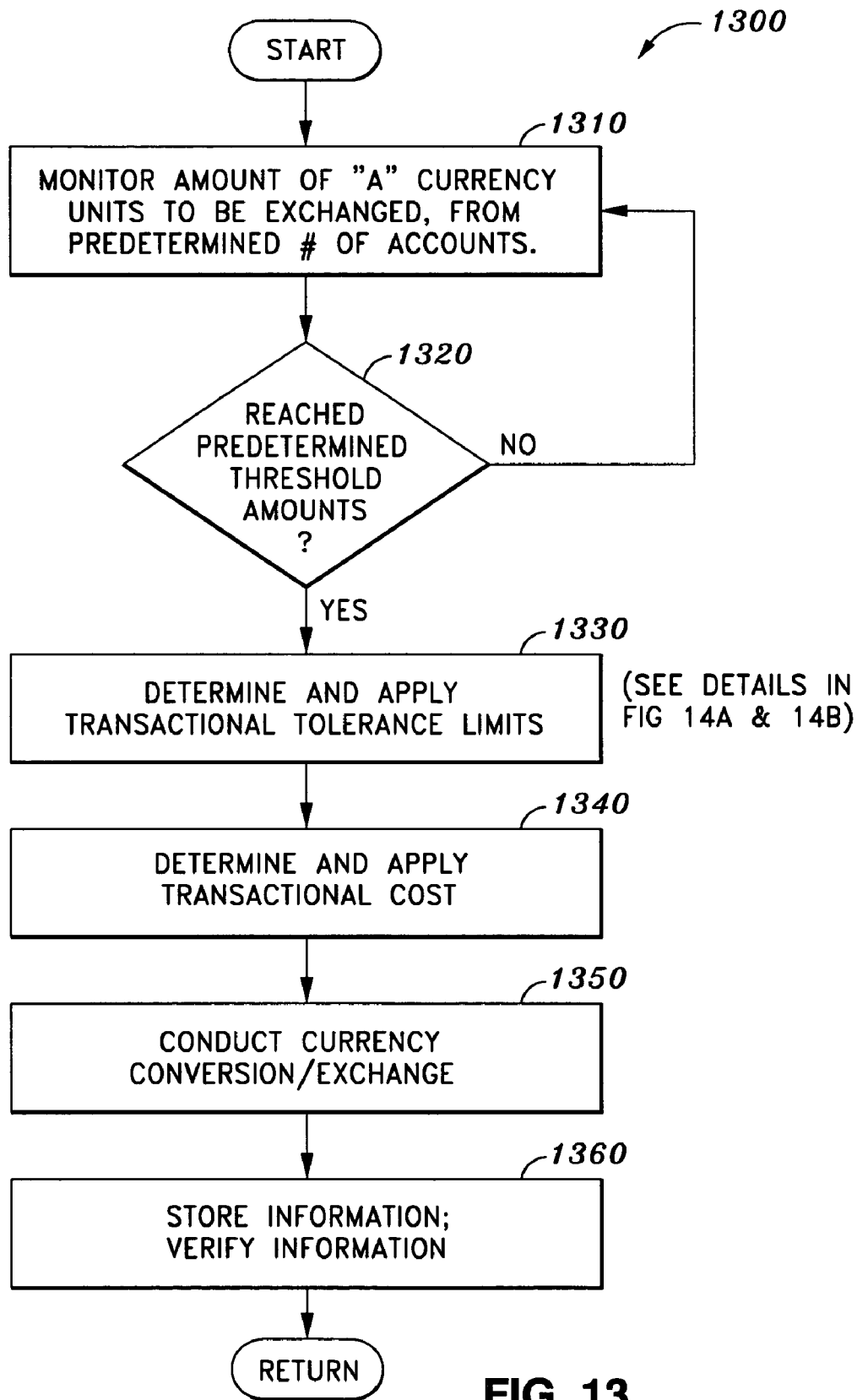
FIG. 13 illustrates one embodiment of a process of currency exchange, consistent with the principles of the invention.

FIG. 13 is a flow diagram of a process for exchanging currency using fund exchange server 20 and accumulator 1205, according to one embodiment. In particular, process 1300 begins with the monitoring of the number of Currency A units to be exchanged. In one embodiment, the Currency A units to be exchanged originate from predetermined accounts, such as accounts $A_1$-$A_N$. Process 1300 continues to decision block 1320 where a determination is made as to whether a predetermined threshold amount of Currency A units has been reached. If not, process 1300 returns to block 1310 to monitor the number of Currency A units to be exchanged. If, on the other hand, the predetermined number of units has been reached, then process 1300 continues to block 1330 where the transactional tolerance limits are determined and applied. The process for determining and applying the transactional tolerance limits are detailed below with reference to FIGS. 14A and 14B. Transaction tolerance limits are limits imposed on allowable transactions based on a risk assessment for the proposed transaction. In one embodiment, a transaction which exceeds the transaction tolerance limit will not be completed.

Thereafter, any transactional costs are determined and applied at block 1340 of FIG. 13. Once the transactional costs have been accounted for, process 1300 moves to block 1350 where the actual currency conversion/exchange takes place (e.g., using formula 1105 or 1110). Finally, process 1300 stores and verifies the exchange information (block 1360), which in one embodiment may be a connected database (e.g., database 22, database 822, etc.).

Figure 14A:
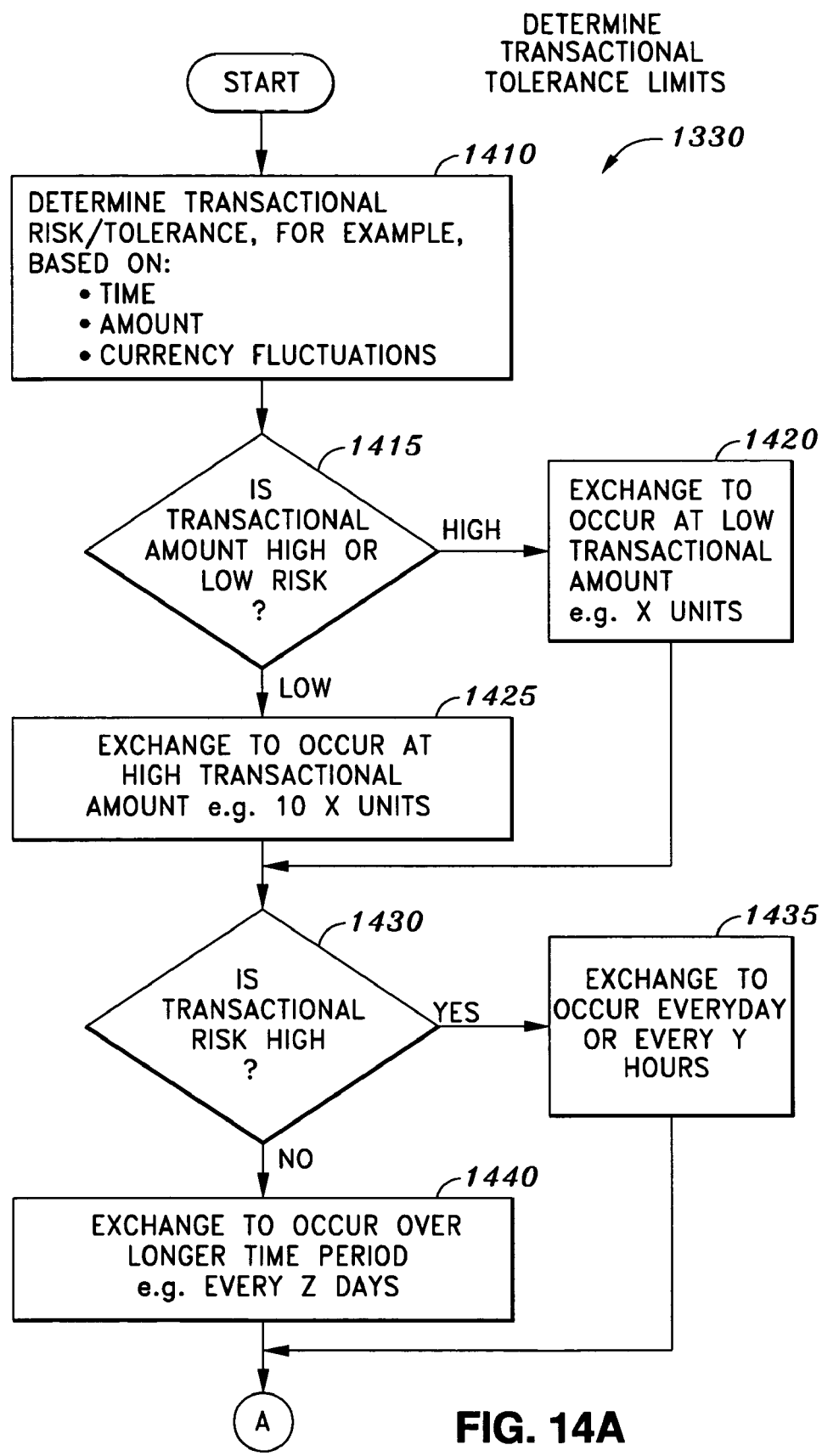
FIGS. 14A & 14B illustrate one embodiment of a process of determining transaction tolerance limits, consistent with the principles of the invention.

As mentioned above, FIGS. 14A-14B is one embodiment of the process for determining and applying transactional tolerance limits (block 1330 of FIG. 13). The process 1330 begins at block 1410 where the transactional risk/tolerance is determined for a given transaction. In one embodiment, this determination may be made by assessing various factors, such as when the transaction is to occur, the type of funding (e.g., bank, credit card, etc.), the amount of the transaction, the frequency of transactions for a given individual, currency fluctuations, etc. In one embodiment, a determination is made at decision block 1415 as to whether the transactional amount is either a "high risk" amount or a "low risk" amount. While FIG. 14A depicts only high and low risk levels, additional incremental levels of risk may similarly be used (e.g., medium, medium high, medium low, etc.). When the risk level of the transactional amount is determined to be "high," the transactional amount at which the exchange is to take place is set to low (e.g., X units of Currency A) (block 1420). If, on the other hand, the risk level of the transactional amount is determined to be "low,"then the transactional amount at which the exchange is to take place is set to high (e.g., 10× units of Currency A) (block 1425).

At this point, the process 1330 continues to block decision block 1430 where a determination is made as to whether the time period of the transaction makes the transactional risk high. If so, the time period for the exchange to take place is set to every day, or alternatively to every Y hours (1435). If, on the other hand, the time period of the transaction does not make it a high risk transaction, process 1330 may simply set the time period for the exchange to take place to be every Z days (1440).

Figure 14B:
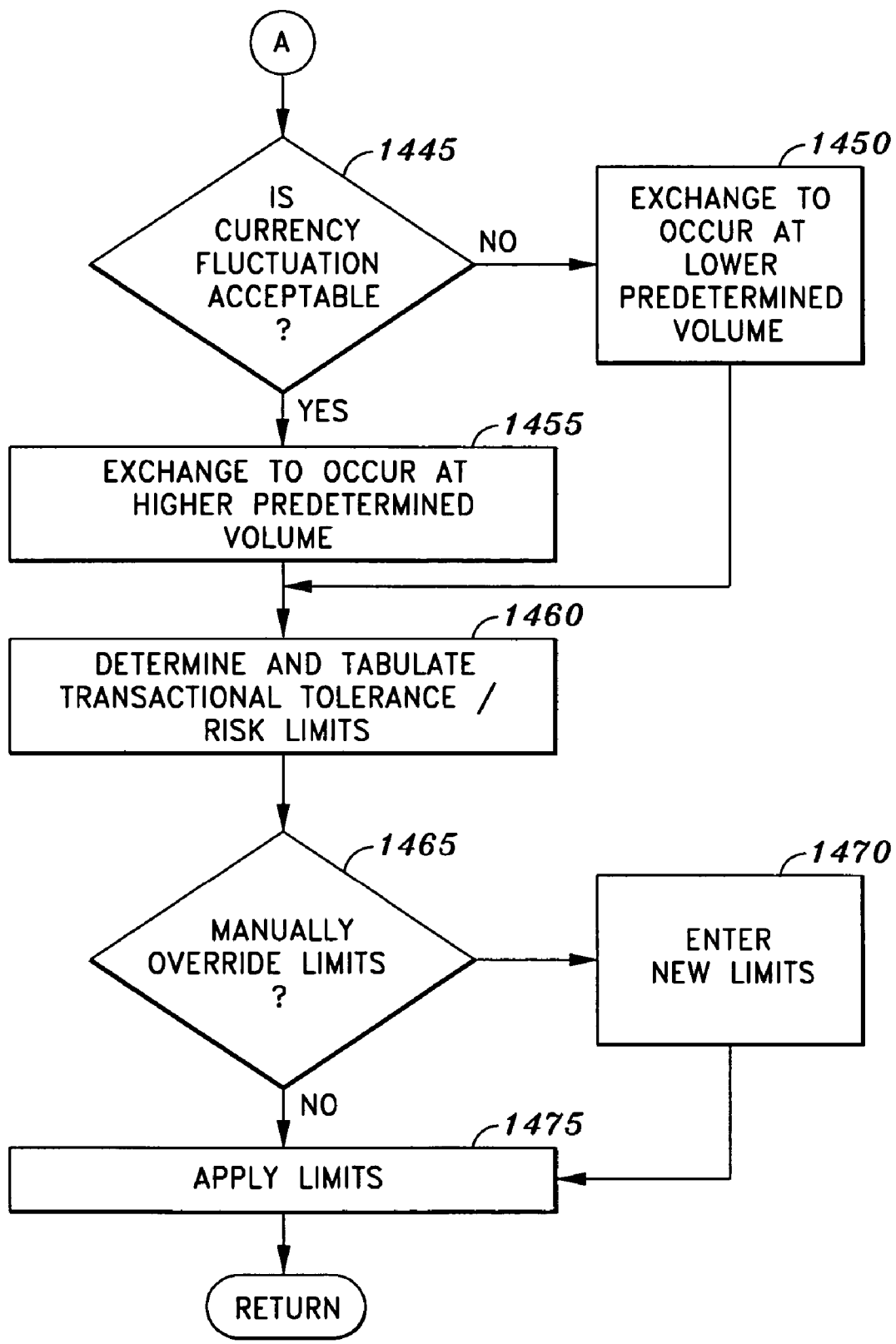

Thereafter, process 1330 continues to block 1445 of FIG. 14B, at which point a determination is made on whether the currency in question has an acceptable level of fluctuation. If not, the exchange of the transaction in question is set to occur at a lower predetermined volume at block 1450, where volume refers to the number of transactions. If it is determined at block 1445 that there is an acceptable level of fluctuation, then the exchange of the transaction in question is set to occur at a higher predetermined volume (block 1455).

At this point in process 1330, the aforementioned determinations are used to determine and tabulate the transactional tolerance limits at block 1460. In some cases, there may be a desire to manually override these determined limits. Accordingly, process 1330 provides for the entry of such manual limits at block 1470.

Figure 15:
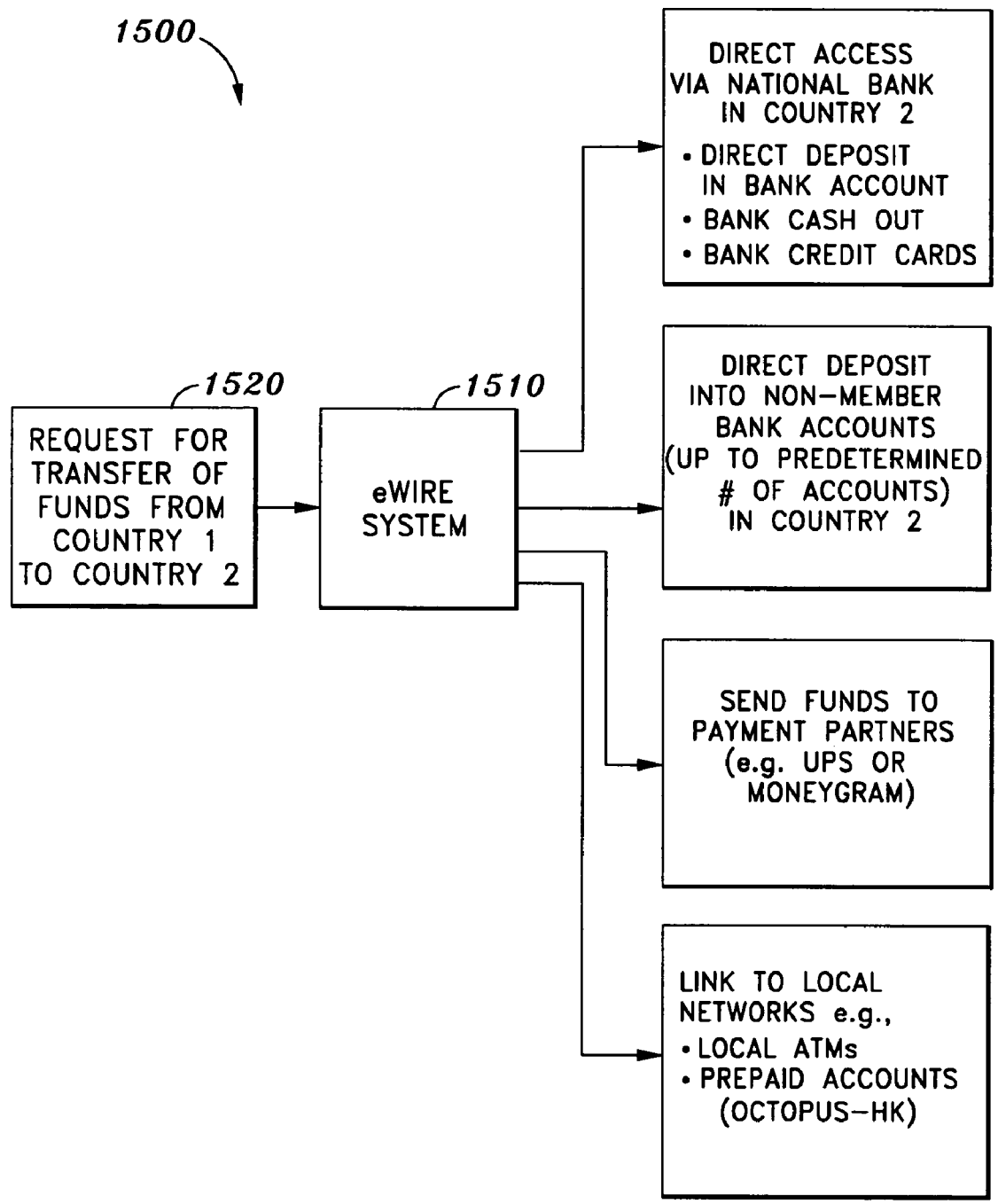
FIG. 15 is one embodiment of a system level diagram for performing an international person-to-person money exchange, according to one embodiment of the invention.

Referring now to FIG. 15, depicted is one embodiment of a diagram 1500 for how an eWIRE system 1510 may interact with other components of the international communication network 900 of FIG. 9. In one embodiment, the eWIRE system 1510 is an electronic fund transfer system. At block 1520, a user may make a request to transfer funds from a first country to a second country. The eWIRE system 1510 then processes and fills the request 1520. In one embodiment, the eWIRE 1510 system fills the request 1520 by one or more of the following:

direct access to a target bank in the second country;
    direct deposit into a non-member bank account;
    transmit funds to a payment partner;
    establish a link to local financial networks.

While the preceding description has been directed to particular embodiments, it is understood that those skilled in the art may conceive modifications and/or variations to the specific embodiments described herein. Any such modifications or variations which fall within the purview of this description are intended to be included herein as well. It is understood that the description herein is intended to be illustrative only and is not intended to limit the scope of the invention.

What is claimed is:

1. A computer-implemented method comprising:
electronically receiving at a computing system a plurality of monetary exchange requests associated with multiple accounts in a first currency to exchange a first plurality of amounts in said first currency for a second plurality of respective amounts in a second currency;
electronically monitoring on said computing system an accumulated amount of said first plurality of amounts in said first currency that has been requested to be exchanged pursuant to said plurality of monetary exchange requests; and,
electronically initiating, on said computing system, batch processing of said plurality of monetary exchange requests in response to said accumulated amount reaching a predetermined level.

2. The method of claim 1, wherein said batch processing of said plurality of monetary exchange requests comprises batch processing said plurality of monetary exchange requests to achieve a preferred exchange rate.

3. The method of claim 1, wherein said batch processing of said plurality of monetary exchange requests comprises exchanging said first plurality of amounts in said first currency for said second plurality of respective amounts in said second currency according to a current exchange rate.

4. The method of claim 3, wherein said batch processing of said plurality of monetary exchange requests comprises batch processing said plurality of monetary exchange requests in response to i) said accumulated amount reaching the predetermined level, and ii) said accumulated amount falling within a trading range.

5. The method of claim 4, wherein said trading range is based on a minimum and maximum specified by a foreign currency exchange system.

6. The method of claim 1, further comprising electronically determining a transactional fee to be imposed for exchanging said first plurality of amounts in said first currency for said second plurality of respective amounts in said second currency.

7. The method of claim 1, further comprising, prior to said batch processing of said plurality of monetary exchange requests, electronically determining if each of said plurality of monetary exchange requests satisfy one or more transactional risk limits.

8. The method of claim 7, wherein said one or more transactional risk limits are based on one or more of a source of funds, a magnitude of a monetary exchange request, a frequency of a monetary exchange request for a particular user, and currency exchange fluctuations.

9. The method of claim 1, further comprising:
electronically receiving financial account information from a first user;
electronically transferring funds based on said financial account information into a first online account associated with said first user;
electronically receiving a transfer request from the first user to transfer funds from said first online account to a second online account, wherein said second online account is associated with a second user and said transfer request is in said first currency;
electronically including said transfer request in said plurality of monetary exchange requests and electronically adding said funds to said accumulated amount; and,
electronically depositing, after said batch processing of said plurality of monetary exchange requests, said funds from said first online account to said second online account in said second currency.

10. The method of claim 9, wherein said receiving the transfer request comprises receiving the transfer request, wherein said transfer request is entered by said first user using a graphical user interface of a display device coupled to the Internet.

11. The method of claim 9, wherein said receiving financial account information comprises receiving financial account information from the first user, wherein said financial account information corresponds to one or more of a credit card account, a bank checking account, a bank savings account, a brokerage account and an ATM check card account.

12. The method of claim 9 further comprising sending an electronic message to said second user using said electronic message address in response to said transfer request, said electronic message to indicate that said funds are ready for transfer to said second user.

13. The method of claim 9 further comprising receiving an electronic response from said second user indicating whether the transfer request is accepted or rejected.

14. The method of claim 1, wherein said transferring funds based on said financial account information comprises transferring funds based on said financial account information from a first financial institution account to said first online account.

15. A computer readable medium comprising instructions which, when executed, cause a computing system to:
receive a plurality of monetary exchange requests associated with multiple accounts in a first currency to exchange a first plurality of amounts in said first currency for a second plurality of respective amounts in a second currency,
monitor an accumulated amount of said first plurality of amounts in said first currency that has been requested to be exchanged pursuant to said plurality of monetary exchange requests, and
initiate batch processing of said plurality of monetary exchange requests in response to said accumulated amount reaching a predetermined level.

16. The computer readable medium of claim 15, wherein said plurality of monetary exchange requests are batch processed to achieve a preferred exchange rate.

17. The computer readable medium of claim 15, wherein said first plurality of amounts in said first currency is exchanged for said second plurality of respective amounts in said second currency according to a current exchange rate.

18. The computer readable medium of claim 17, wherein said plurality of monetary exchange requests are processed in response to i) said accumulated amount reaching the predetermined level, and ii) said accumulated amount falling within a trading range.

19. The computer readable medium of claim 18, wherein said trading range is based on a minimum and maximum specified by a foreign currency exchange system.

20. The computer readable medium of claim 15, further comprising instructions to cause the computing system to determine a transactional fee to be imposed for exchanging said first plurality of amounts in said first currency for said second plurality of respective amounts in said second currency.

21. The computer readable medium of claim 15, further comprising instructions to cause the computing system to, prior to processing said plurality of monetary exchange requests, determine if each of said plurality of monetary exchange requests satisfy one or more transactional risk limits.

22. The computer readable medium of claim 21, wherein said one or more transactional risk limits are based on one or more of a source of funds, a magnitude of a monetary exchange request, a frequency of a monetary exchange request for a particular user, and currency exchange fluctuations.

23. The computer readable medium of claim 15, further comprising instructions to cause the computing system to:
receive financial account information from a first user;
transfer funds based on said financial account information into a first online account associated with said first user;
receive a transfer request from the first user to transfer funds from said first online account to a second online account, wherein said second online account is associated with a second user and said transfer request is in said first currency;
include said transfer request in said plurality of monetary exchange requests and add said funds to said accumulated amount; and
deposit, after processing said plurality of monetary exchange requests, said funds from said first online account to said second online account in said second currency.

24. The computer readable medium of claim 23, wherein said transfer request is entered by said first user using a graphical user interface of a display device coupled to said network.

25. The computer readable medium of claim 23, wherein said financial account information corresponds to one or more of a credit card account, a bank checking account, a bank savings account, a brokerage account and an ATM check card account.

26. The computer readable medium of claim 23, further comprising instructions to cause the computing system to send an electronic message to said second user using said electronic message address in response to said transfer request, said electronic message to indicate that said funds are ready for transfer to said second user.

27. The computer readable medium of claim 23, further comprising instructions to cause the computing system to receive a response from said second user indicating whether the transfer request is accepted or rejected.

28. The computer readable medium of claim 15, wherein said funds are transferred to said first online account based on said financial account information from a source financial institution.

29. A system comprising:
an accumulator, stored in computer memory, for receiving a plurality of monetary exchange requests associated with multiple accounts in a first currency to exchange a first plurality of amounts in said first currency for a second plurality of respective amounts in a second currency, and monitoring an accumulated amount of said first plurality of amounts in said first currency that has been requested to be exchanged pursuant to said plurality of monetary exchange requests; and
logic, stored in computer memory, for initiating batch processing of said plurality of monetary exchange requests in response to said accumulated amount reaching a predetermined level.

* * * * *